United States Patent [19]

Hughes et al.

[11] Patent Number: 4,840,670

[45] Date of Patent: Jun. 20, 1989

[54] WATER SOLUBLE COLORING COMPOSITIONS CONTAINING SPARKLE COMPONENTS

[75] Inventors: Cleveland L. Hughes, Grand Terrace; Timothy N. Williams, Canoga Park; Paul M. Mandel, Jr., Orange, all of Calif.

[73] Assignee: Color Quest Inc., Anaheim, Calif.

[21] Appl. No.: 25,854

[22] Filed: Mar. 16, 1987

[51] Int. Cl.$^4$ .............................................. C09D 11/00
[52] U.S. Cl. ........................................ 106/19; 106/31; 106/272; 524/276; 524/277
[58] Field of Search ................. 106/20, 23, 25, 31, 106/272, 19; 524/276, 277

[56] References Cited

U.S. PATENT DOCUMENTS

| | | | |
|---|---|---|---|
| 2,013,417 | 9/1935 | Meister | 252/301.3 |
| 2,380,126 | 7/1945 | Sturm | 260/738 |
| 2,398,559 | 4/1946 | Robinson et al. | 106/19 |
| 2,763,785 | 9/1956 | Switzer | 250/71 |
| 2,835,600 | 5/1958 | Zgraggen | 106/19 |
| 3,057,806 | 10/1962 | Switzer | 252/301.2 |
| 3,074,801 | 1/1963 | Gessler et al. | 106/30 |
| 3,769,045 | 10/1973 | Maierson et al. | 106/19 |
| 3,864,294 | 2/1975 | Busch, Jr. | 106/31 |
| 3,993,492 | 11/1976 | Wooly | 106/19 |
| 3,993,821 | 11/1976 | Goss | 428/208 |
| 4,010,293 | 3/1977 | Davis | 427/214 |
| 4,116,710 | 9/1978 | Heikel | 106/290 |
| 4,212,786 | 7/1980 | Murakami | 260/31.2 R |
| 4,221,593 | 9/1980 | Kubo | 106/20 |
| 4,233,195 | 11/1980 | Mills | 260/23 S |
| 4,348,234 | 9/1982 | Cespon | 106/31 |
| 4,525,214 | 6/1985 | Panken | 106/19 |
| 4,617,058 | 10/1986 | Lee et al. | 106/19 |

OTHER PUBLICATIONS

Derwent Abstract Accession No. 81-68172 D/38, German Patent No. DE 3010863, Sep. 10, 1981.
Derwent Abstract Accession No. 81-506490/28, Japanese Patent No. 56059879, May 23, 1981.
Derwent Abstract Accession No. 83-701084/27, European Patent No. 82497, Jun. 29, 1983.
Derwent Abstract Accession No. 83,706771/28, European Patent No. 82986, Jul. 6, 1983.
Derwent Abstract Accession No. '85-000946/01, German Patent No. 3321953.
Derwent Abstract Accession No. 85-155434/26, Japanese Patent No. 60086177, May 15, 1985.

*Primary Examiner*—Amelia B. Yarbrough
*Attorney, Agent, or Firm*—Willie Krawitz

[57] ABSTRACT

Water soluble coloring compositions are provided that contain a stable and uniform suspension of color and sparkle or glitter components. The process for producing the coloring compositions employs a lower temperature range than the prior art; this reduces the need for equipment heating and enables the equipment to be more readily cleaned.

3 Claims, No Drawings

WATER SOLUBLE COLORING COMPOSITIONS CONTAINING SPARKLE COMPONENTS

BACKGROUND OF THE INVENTION

This invention relates to a new and improved composition and process for producing coloring compositions. These have use in water soluble solid paints, poster paints, for color brushes and for roller balls, crayons, and the like. The coloring compositions of this invention also contain sparkle components which are maintained as a stable and uniform solid suspension in the coloring system.

The present paint compositions containing such sparkle components are pleasing visually, and also tend to take on the appearance of a multi-dimension because they are usually applied in a non uniform fashion.

Prior art paint compositions are manufactured at comparatively high temperatures estimated at about 130° F., and produce a paint that hardens rapidly. Consequently, heaters are generally used at various steps of the process, and this requirement makes it difficult to clean the equipment. Also, it is difficult to obtain water soluble paint compositions containing sparkle components that can be maintained as a stable and uniform suspension.

Water soluble paint compositions produced by prior art processes generally do not contain a smell or scent component because they are evaporated or volatized by the high processing temperature. However, if a lower processing temperature range was possible, smell components such as scents, fragrances and perfumes could be incorporated and retained in the composition.

THE INVENTION

According to the invention, a water soluble paint composition is provided containing: water; a polymeric thickener to maintain solid components such as the color and the sparkle or glitter in a uniform and permanent suspension; a water soluble wax to thicken and harden the composition; glycerin, and the like to increase the time span of hardening to enable the mixture to flow without undue heating; and adhesive thickener; and, glitter and coloring agents.

The polymeric thickener may include a polyacrylic or polymethacrylic acid having polyfunctional groups; the polymeric acid is thickened or cured with an activator, infra. A typical polymeric thickener is sold by B.F. Goodrich under the trade name of CARBOPOL. Another suitable polyacrylic acid is sold as CARBOMER 941. The function of the thickener is to solidify the composition as a gel near the termination of the mixing process, and this enables solids such as glitter, sparkle or color to be maintained as a uniform and permanent solid suspension.

Other thickeners included in the term 'polymeric thickener' are: nitrile latexes, styrene-butadiene latexes, polyisobutylene, acrylic latexes, rosin gum, food thickeners such as flours and starches, fumed silica, hydroxypropyl methyl cellulose, hydroxybutyl methyl cellulose, and so forth.

The water soluble wax is employed to thicken and harden the composition. The use of the wax offsets the cost of the more expensive adhesive thickener such as gum arabic, and also functions as an adhesive itself. Typical water soluble waxes are of the microcrystalline variety, and include EMERWAX 1255 and METHOCEL.

Glycerin is used to enable the composition to flow with little or no application of heat and to increase the time span of hardening (to say within 48 hours). The glycerin is usually employed as 99.5% U.S.P. The glycerin may be replaced with sorbitol, and to a certain extent with other alcohols such as cetyl, and mixtures thereof.

The combination of the glycerin, wax and polymer results in a coloring composition which is liquid and pourable at a temperature in excess of about 85° F. Hence, no expensive processing equipment is required. Moreover, upon contact with air, the surface of the coloring composition will harden, and this permits subsequent handling after the processing step to facilitate pouring into molds and curing in place.

An activator for the polymeric thickener is used to polymerize and thereby thicken the polymer. In the case of the polyacrylic acid, suitable catalysts or activators include triethanolamine, and other amines such as ethyl, propyl and hexyl. In addition to causing the suspension to thicken and gel, the activator also serves as a pH buffer and to dissolve the preservative, if one is employed. In other cases, the polymeric thickener may be activated by heat, etc.

An adhesive thickener such as gum arabic or acacia gum is used to thicken the composition and act as an adhesive or binder. Other adhesive thickeners such as tragacinth gum, and plant mucilages are also suitable.

To the extent that the polymeric thickener, wax and adhesive thickener have similar properties, they may be used somewhat interchangeably. Their function is to maintain the color and glitter in a permanent and solid suspension.

Magnesium stearate may be used to increase the hardening time and to function as a plasticizer and/or dispersing agent for the composition following processing, and also to substitute in part for the gum arabic. Equivalent compounds are also available, such as Ca stearate, Na stearate, di-butyl phthalate, di-isobutyl phthalate, dioctyl adipate, etc.

Colors which may be employed are standard F.D. & C. colors, and non F.D. &. C colors, both water soluble, and water insoluble.

The sparkle or glitter ingredients include those which are light reflective; light absorptive; light absorptive and which transmit a single different color; and, light absorptive and which transmit two or more different colors. Suitable sparkle or glitter ingredients are sold under the generic names of TIMIRON, BIVIRON, COLORONA, DICHRONA, and the like and contain varying amounts of mica and $TiO_2$. Other sparkle or glitter ingredients may include $Cr(OH)_2$ and mica, castor oil and mica, iron oxides and mica, bismuth oxychlorides, etc. These materials are sold by Mearl Products, Rona and Mallingkrodt. Aluminum and other metal particles also may be used.

When preservatives or stabilizers are used, they may include: imidazolidienyl urea (0.25%–0.35%); methyl or propyl paraben (0.75%–1.0%, and 0.25%–0.35%, respectively); DOWOCIL 200 (0.1%–0.5%); and, so forth. Bactericides, slimicides, etc., also may be used in addition to the preservatives or stabilizers.

It will be appreciated that the compositions can be removed from the processing equipment and pouring equipment simply by washing with water. This enables the equipment to be changed over to a different coloring formulation without undue difficulty.

DESCRIPTION OF THE PREFERRED EMBODIMENTS

Typically, for a water soluble, solid coloring paint, a suitable approximate range of ingredients, by percentage weight, for the broadest and preferred range of ingredients, respectively, is as follows:

| | | |
|---|---|---|
| Water (deionized) | 45%–55% | 45%–55% |
| Polymeric thickener | 0%–0.5% | .05%–0.5% |
| Water soluble wax | 0%–5% | 1%–5% |
| Glycerin and/or long chain alcohols | 0%–10% | 1%–10% |
| Activator for polymeric thickener | 0%–0.5% | 0%–0.5% |
| Adhesive thickener | 0%–25% | 8%–25% |
| Hardener | 0%–0.5% | 0%–0.5% |
| Color | 3%–5% | 3%–5% |
| Sparkle or glitter | 21%–30% | 21%–30% |
| Preservative | 0%–1% | 0.1%–1% |

A preferred composition is, as follows: Polyacrylic acid (CARBOMER 941): 0.12%: Water soluble microcrystalline wax (EMERWAX 1255): 2%; Glycerin (U.S.P. 99.5%): 6%; amine activator (triethanolamine): 0.1%; Adhesive thickener (gum arabic): 12%; Hardener (Mg stearate): 0.3%; Color: 4%; Glitter: 24%; preservative: 0.46%; and, Water (deionized): 51%, or balance.

Another suitable composition is, as follows: Polyacrylic acid: 0.15%; Wax:2.8%; Glycerin: 7.25%; activator: 0.15%; Adhesive thickener: 10%; Hardener: 0.3%; Color: 4.5%; Glitter: 29.5%; Preservative: 0.35%; and, Water: 45%, or balance.

Another suitable composition is, as follows: Polymeric thickener: 0.15%; Wax: 2%., Glycerin: 8.75%; Activator: 0.15%; Adhesive: 10.25%; Hardener: 0.35%; Color: 3%; Sparkle: 21%; Preservative: 0.35%; and, Water: 54%, or balance.

The use of the formulation for poster paints, color brushes and roller balls requires the omission of the adhesive (gum arabic or gum tragacinth, mucilage, etc.) and the hardening agent (Mg stearate, etc.), and a decrease in the glitter or sparkle components. A suitable, approximate range of component concentrations, by percentage weight is, as follows:
Water (deionized): 75%–65%
Polymeric thickener: 0%–1%
Water soluble wax: 3%–8%
Glycerin and/or long chain alcohols: 5%–12%
Activator for polymeric thickener: 0%–1%
Preservative: 0.25%–0.35%
Color: 1%–5%
Sparkle or Glitter: 8%–15%.

A typical composition is, as follows: Water: 72%; CARBONER 941: 0.76%; EMERWAX 1255: 4%; Glycerin: 8%; Activator: 0.76%; Preservative: 0.15%–0.35%; Color: 3%; and, Glitter: 12%.

A suitable crayon composition is, as follows:
Water soluble wax: 30%–70%
Polymeric thickener: 0%–4%
Polymeric thickener: 0%–4%
Color 3%–10%
Sparkle or glitter: 20%–35%
Preservative 0%–3%

A preferred crayon composition is, as follows: Water soluble wax (EMERWAX 1255): 54.5%; Water soluble wax(MULTIWAX W 445): 5.9%; Polymeric thickener(CAB-O-SIL H55) silica gel: 1.2%; Polymeric thickener (non-ionic, water soluble, cellulose ethers: METHOCEL - Dow Chemical) 1.2%; Color: 6.0%; Sparkle: 30%; and, Preservative: 1.2%. This composition, as in the other compositions, has a processing temperature which is in the same range. Also, following application to a surface, such as paper, the sparkle appearance can be enhanced simply by rubbing.

For solid color paints, a suitable process for their manufacture includes: 1. adding CARBOMER and water to a high speed shear blender and mixing for about 10 minutes to obtain a uniform blend; 2. the blend is heated to about 130° F. for about 20 minutes to ½ hour with added glycerin and EMERWAX. This heating will melt the wax, and blending is continued for an additional ½ hour to 40 minutes to obtain a blending time of about 1 hour for the mixture of CARBOMER, water, glycering and EMERWAX; 3. the balance of the ingredients (except the activator) are added, and the blending is continued at a reduced temperature of about 115° F. –120° F. for about ½ hour; 4. the activator is then added last and the blending is continued for about 15 minutes; 5. the ingredients are poured to a machine filler at about 90° F.–115° F., and poured and then hardened in situ for up to about 48 hours.

A similar procedure is followed in the case of poster paints, color brushes and roller balls. In the case of the crayons, the ingredients are heated and blended for a sufficient time to obtain a uniform met, the components being added in the same order as for color paints, where appropriate. If it is desired to incorporate scents, perfumes, flavors, etc., into the composition, these may be added in step 3. These can include licorice, chocolate, lemon, lime, fragrances, etc.

While the components disclosed are of the water soluble type, water insoluble components may be used and still produce a phase compatable compound. This is obtained by linking components such as water insoluble thickeners, waxes, colors and adhesives to the water soluble components using dispersing agents such as quaternary ammonium compounds, polysorbates, polyethylene glycols (PEG compounds), etc. This technique enables compounds such as stearic acid and cetyl alcohol to be substituted in place of or used in conjunction with the microcrystalline wax.

We claim:

1. A water soluble paint composition including poster paints, color brushes, and roller balls consisting of: water; a polymeric thickener to maintain solid components in a uniform and permanent suspension in the composition, selected from the group consisting of a polyacrylic acid, nitrile latexes, styrene-butadiene latexes, polyisobutylene, acrylic latexes, rosin gum, flours, starches, fumed silica, hydroxypropyl methyl cellulose, hydroxy butyl methyl cellulose; glycerin, or alcohols selected from the group consisting of sorbitol, cetyl, and mixtures thereof in liquid form to enable the mixture to flow at about 85° F.–130° F.; a water soluble microcrystalline wax to thicken the composition; and, glitter and coloring agents.

2. The water soluble paint composition of claim 1, including poster paints, color brushes, and roller balls, consisting of: water 75%–65%; polymeric thickener 0%–1%; water soluble microcrystalline wax: 3%–8%; glycerin and/or long chain alcohols: 5%–12%; activator for polymeric thickener: 0%–1%; colorant: 1%–5%; and, sparkle or glitter: 8%–15%.

3. The water soluble paint composition of claim 1, including poster paints, color brushes, and roller balls, consisting of: water: 75%–65%; polyacrylic acid: 0%–1%; water soluble microcrystalline wax: 3%–8%; glycerin and/or long chain alcohols: 5%–12%; activator for polyacrylic acid: 0%–1%; preservative: 0.25%–0.35%; colorant: 1%–5%; and, sparkle or glitter: 8%–15%.

* * * * *